June 1, 1926.
J. TÁLOS
1,587,439
TIRE
Filed Sept. 4, 1923
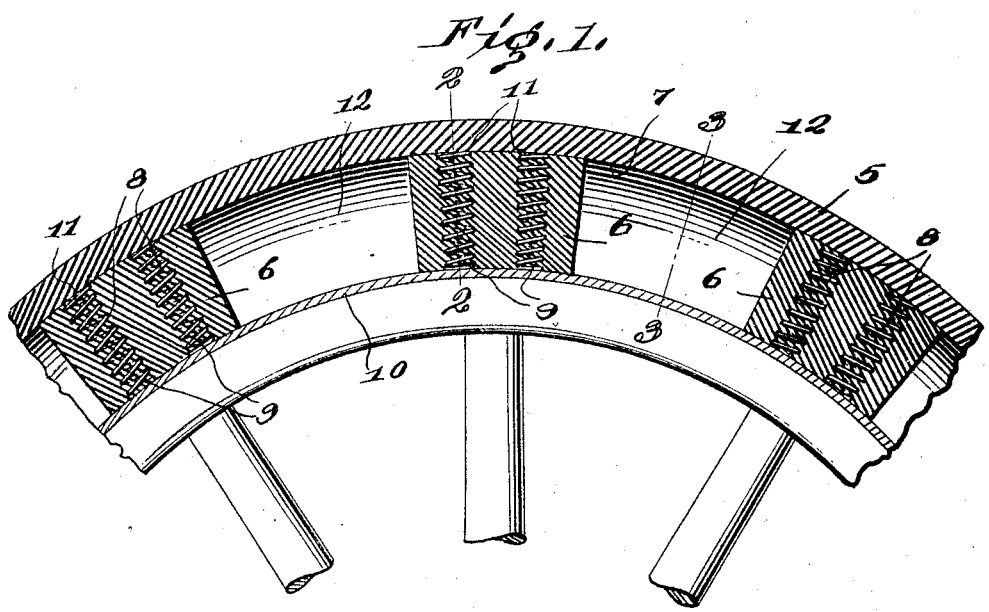
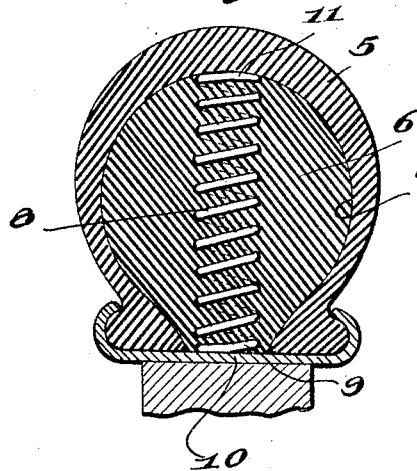
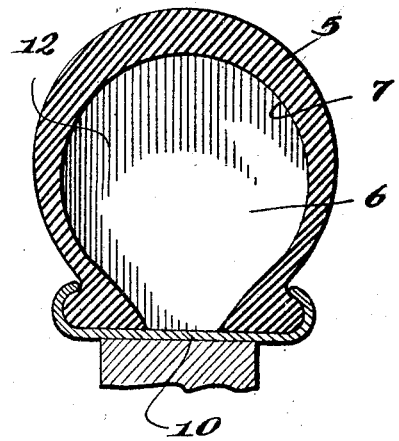
Inventor
John Tálos
By J. W. Milburn
Attorney Patented June 1, 1926.

1,587,439

UNITED STATES PATENT OFFICE.

JOHN TÁLOS, OF AKRON, OHIO.

TIRE.

Application filed September 4, 1923. Serial No. 660,946.

The invention relates to a cushion tire and more particularly to a cushion tire provided with metallic springs.

The usual types of cushion tires are not sufficiently resilient to counteract or absorb heavy road shocks and thus even though they are not subject to blow-outs or punctures such as are pneumatic tires they are not as satisfactory as the pneumatic type. This is due to the fact that cushion tires are usually so constructed that they are either too solid to absorb any shock or too soft and non-resilient to counteract the road shocks and readily expand when one shock is passed.

A particular disadvantage of cushion tires provided with metallic springs is that open moving parts are thus provided which are very liable to become broken or loosened, thus hampering the action of the tire.

An important object of the present invention is to provide a cushion tire which is so constructed that it will absorb and counteract all road shocks and which will be fully as resilient as the usual pneumatic tire.

A further object of the invention is to so arrange the metallic springs in the tire that they are practically integral with the rubber portions of the tire.

Other objects and advantages of the invention will appear in the following specification, reference being had to the accompanying drawing, in which—

Figure 1 is a vertical sectional view through the tire,

Figure 2 is a transverse section taken on the line 2—2 of Figure 1, and

Figure 3 is a transverse section taken on the line 3—3 of Figure 1.

In the drawings, wherein similar reference numerals designate like parts throughout the views, the numeral 5 indicates a tire casing of the type generally employed in pneumatic tires and which provides an annular chamber open at its inner side to permit of access being had thereto. Resilient blocks 6, preferably formed of rubber, are secured to the wall 7 of the chamber formed by the casing 5 and are circumferentially spaced therein so that air spaces 12 will be provided between the blocks 6, as shown. Each of the blocks abuts against and is secured to the wall 7 of the chamber and further each block is flush at its inner end with the cylindrical edges of the casing 5. Each of the blocks conforms in contour to the cross sectional shape throughout of the chamber formed by the casing 5. Metallic springs 8 are formed in the resilient blocks 6 and have their inner ends 9 flush with the inner end of the block 6 and bearing on the wheel rim 10. The outer ends 11 of the springs 8 are so formed in the resilient blocks 6 as to bear against the inner face of the tread portion of the casing 5.

In constructing a tire according to my invention the springs 8 are formed in the blocks 6 when expanded and while the blocks are being molded. The blocks 6 are fixed to the inner wall 7 of the casing 5 when the casing and blocks are subjected to the usual "curing" process. This makes for a unitary structure and one in which there are no open moving parts.

It will be seen that a very strongly constructed tire is thus provided and one which is quite resilient. The road shocks will be absorbed by the rubber casing and the resilient blocks 6 but only relatively hard "road shocks" will altogether compress the casing and blocks because the springs 8 will always tend to hold the rubber parts of the tire expanded and when any shock is encountered and passed the springs 8 will immediately again force the rubber parts to expanded position, much more readily than if the rubber blocks alone were relied upon for this purpose.

As many springs may be provided in each block 6 as may be desired, depending entirely upon the weight or capacity of the vehicle on which the tire is to be used.

I claim:

A tire comprising a casing providing an annular chamber open throughout at its inner side, spaced resilient solid blocks mounted within and secured throughout to the wall of said chamber, each of said blocks of the same cross sectional shape throughout as the cross sectional shape of said chamber, said blocks having their inner ends flush with the inner edges of said casing and each further adapted to have its inner end throughout bear directly upon a tire rim, and a plurality of spaced expanded coiled springs embedded in an expanded position in each of said blocks, the coil of each of said springs at the outer end thereof bearing directly against the inner face of the casing at the tread portion thereof and each of said springs further adapted to have the coil at the inner end thereof bear directly upon the tire rim.

In testimony whereof, I affix my signature.

JOHN TÁLOS.